United States Patent
Kim et al.

(10) Patent No.: US 8,399,141 B2
(45) Date of Patent: Mar. 19, 2013

(54) FUEL CELL SYSTEM AND FUEL CELL POWER MANAGING METHOD

(75) Inventors: Young-jae Kim, Seoul (KR); Lei Hu, Yongin-si (KR); Hye-jung Cho, Anyang-si (KR); Joon-hee Kim, Seongnam-si (KR); Seong-kee Yoon, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 517 days.

(21) Appl. No.: 12/644,294

(22) Filed: Dec. 22, 2009

(65) Prior Publication Data

US 2010/0173211 A1 Jul. 8, 2010

(30) Foreign Application Priority Data

Jan. 7, 2009 (KR) .................. 10-2009-0001248

(51) Int. Cl.
*H01M 8/00* (2006.01)
(52) U.S. Cl. .................. 429/431; 429/430; 429/432
(58) Field of Classification Search .................. None
See application file for complete search history.

(56) References Cited

U.S. PATENT DOCUMENTS

| 2005/0014043 | A1 | 1/2005 | Kozu et al. |
| 2008/0102322 | A1* | 5/2008 | Pearson ............... 429/9 |
| 2009/0325004 | A1* | 12/2009 | Choi et al. ............ 429/13 |
| 2010/0316920 | A1* | 12/2010 | Makita et al. ......... 429/432 |

FOREIGN PATENT DOCUMENTS

| JP | 2005-038792 A | 2/2005 |
| JP | 2005-056764 A | 3/2005 |

OTHER PUBLICATIONS

Japanese Office action dated May 22, 2012 for co-pending Japanese Application No. 2009-296107 (Young-jae Kim et al.).

* cited by examiner

*Primary Examiner* — Patrick Ryan
*Assistant Examiner* — Wyatt McConnell
(74) *Attorney, Agent, or Firm* — Lee & Morse, P.C.

(57) ABSTRACT

A fuel cell system and a fuel cell power managing method in which the fuel cell system controls a current output of a fuel cell by adjusting a target voltage value of the fuel cell according to a difference between a current value of the fuel cell and a target constant current value. By doing so, the fuel cell system may allow the fuel cell to stably and constantly output a constant current.

18 Claims, 5 Drawing Sheets

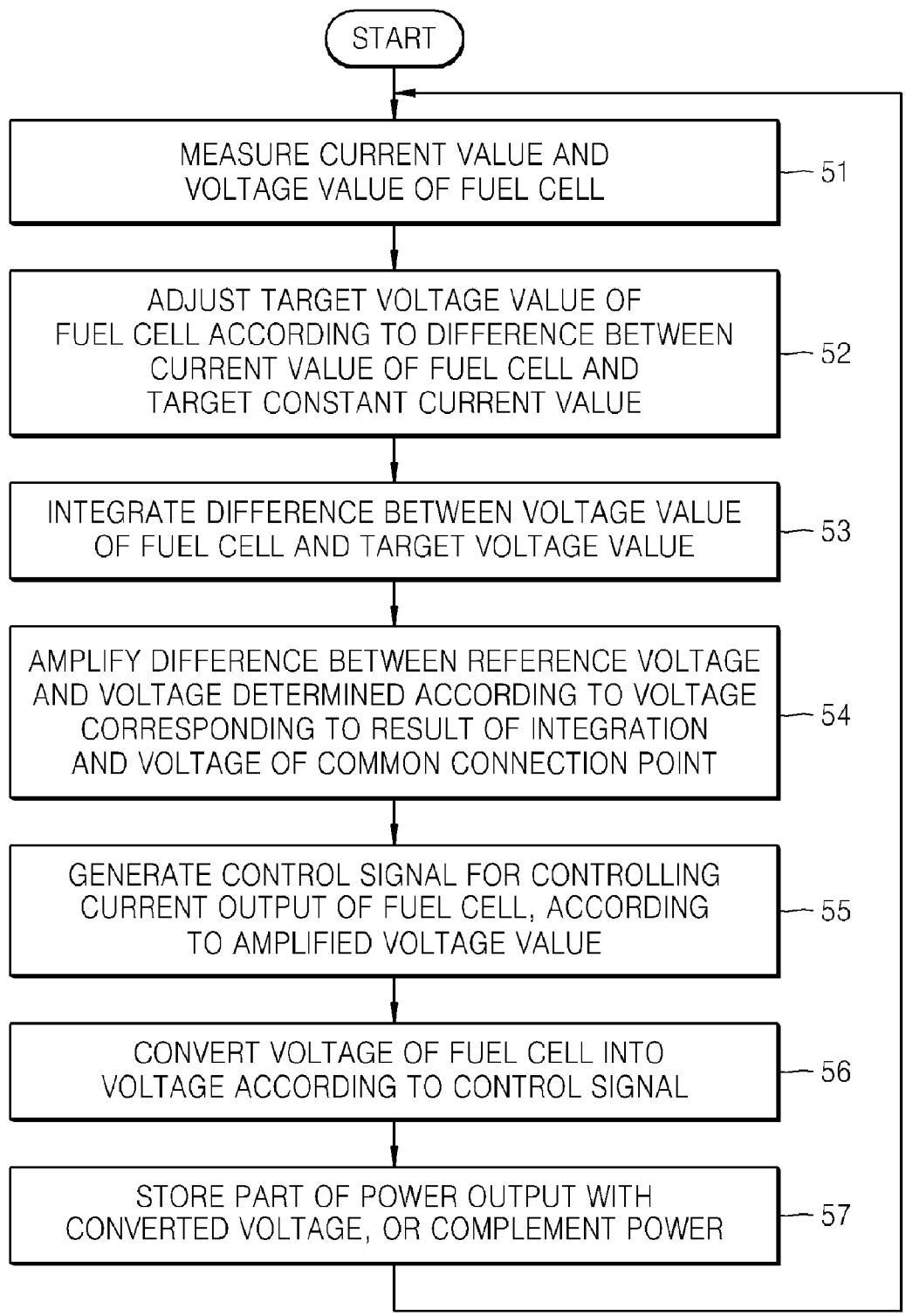

FUEL CELL SYSTEM AND FUEL CELL POWER MANAGING METHOD

CROSS-REFERENCE TO RELATED APPLICATION

This application claims the benefit of Korean Patent Application No. 10-2009-0001248, filed Jan. 7, 2009 in the Korean Intellectual Property Office, the disclosure of which is incorporated herein by reference.

BACKGROUND

1. Field

One or more embodiments relate to a fuel cell system and a fuel cell power managing method.

2. Description of the Related Art

A fuel cell is an environmentally friendly alternative energy technology to generate electrical energy from a material, such as hydrogen that is abundant, and is highlighted along with solar cell technology. In general, the fuel cell has a large impedance so as to have a low response speed with respect to a load change. In order to account for this, a chargeable secondary cell is mounted in a fuel cell system, which is currently being developed.

The fuel cell system may be divided into a system for a constant voltage operation, a system for a constant current operation, and a system for a constant power operation. In general, the system for the constant current operation of the fuel cell is arranged with a current limiting device in a direct current/direct current (DC/DC) converter so as to prevent an output current of the fuel cell from being lower than a selected current.

SUMMARY

One or more embodiments include a fuel cell system and a fuel cell power managing method, which allow a fuel cell to stably and constantly output a constant current. Additional aspects will be set forth in part in the description which follows and, in part, will be apparent from the description, or may be learned by practice of the presented embodiments.

One or more embodiments may include a fuel cell system including a measuring unit to measure a current value and a voltage value output from a fuel cell; a control unit to control a current output of the fuel cell by adjusting a target voltage value of the fuel cell according to a difference between the measured current value and a target constant current value; and a converter to convert a voltage output from the fuel cell into a voltage applied to a load according to a control signal from the control unit.

One or more embodiments may include a fuel cell power managing method including the operations of measuring a current value and a voltage value which are output from a fuel cell; adjusting a target voltage value of the fuel cell, according to a difference between the measured current value and a target constant current value; generating a control signal to control a current output from the fuel cell according to a difference between the measured voltage value and the target voltage value; and converting a voltage output from the fuel cell into a voltage applied to a load according to the control signal.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 5 is a flowchart of a fuel cell power managing method according to an embodiment.

DETAILED DESCRIPTION

Figure 1:
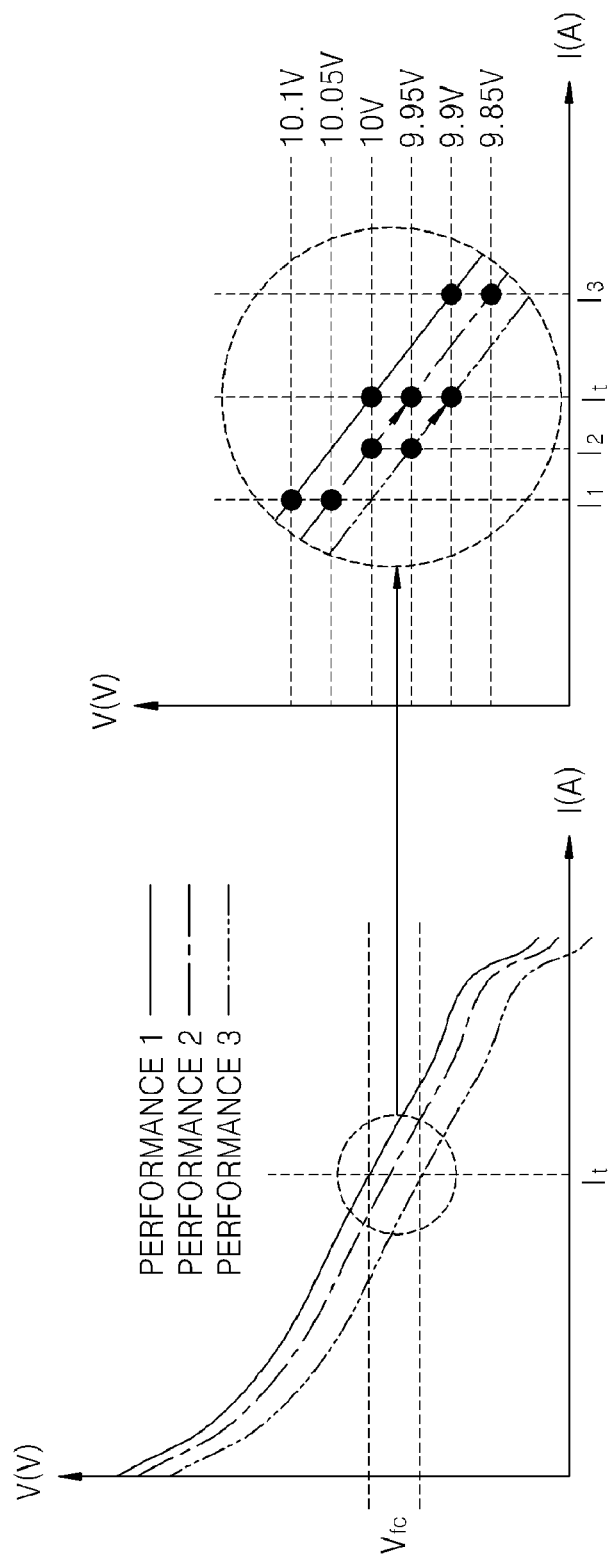
FIG. 1 illustrates current-voltage curves applied to one or more embodiments.

Reference will now be made in detail to the present embodiments examples of which are illustrated in the accompanying drawings, wherein like reference numerals refer to the like elements throughout. The embodiments are described below in order to explain aspects of the present invention by referring to the figures.

One or more embodiments relate to a fuel cell system and a fuel cell power managing method. Detailed descriptions about stacks, Balance of Plants (BOP), and the like, of a fuel cell and which are well known to one of ordinary skill in the art, are omitted here. In fact, a current and voltage output from the fuel cell indicate the current and voltage output from the stacks of the fuel cell. However, for convenience of description, the current and voltage output from the stacks of the fuel cell are referred to as "the current and voltage output from the fuel cell."

FIG. 1 illustrates current-voltage curves applied to one or more embodiments. As illustrated in FIG. 1, the performance of a fuel cell is degraded according to an operation condition and operation time. In this regard, an increase in the operation time of the fuel cell may cause the performance of the fuel cell to degrade. Assuming that a first performance curve (PERFORMANCE 1) of FIG. 1 indicates the performance of the fuel cell at an initial operation, the performance may be degraded, as illustrated in a second performance curve (PERFORMANCE 2) or a third performance curve (PERFORMANCE 3), according to a change in the operation condition and operation time. Thus, in order to allow a constant current to be output from the fuel cell, one or more embodiments convert an output voltage of the fuel cell into an output voltage that matches a performance curve at a point at which the output voltage is output to output the desired constant current.

For example, if an output voltage of the fuel cell is 10V when the performance of the fuel cell is degraded from the first performance curve to the second performance curve, the output voltage of the fuel cell is changed to 9.95V so as to allow the constant current to be output from the fuel cell. Thus, instead of outputting a second current $I_2$ at 10V, the fuel cell outputs the constant current $I_t$ at 9.95V. After that, if the performance of the fuel cell is further degraded from the second performance curve to the third performance curve, the output voltage of the fuel cell is changed from 9.95V to 9.9V so as to allow the constant current $I_t$ to be output from the fuel cell. Thus, instead of outputting the second current $I_2$ at 9.95V, the fuel cell outputs the constant current $I_t$ at 9.9V.

Figure 2:
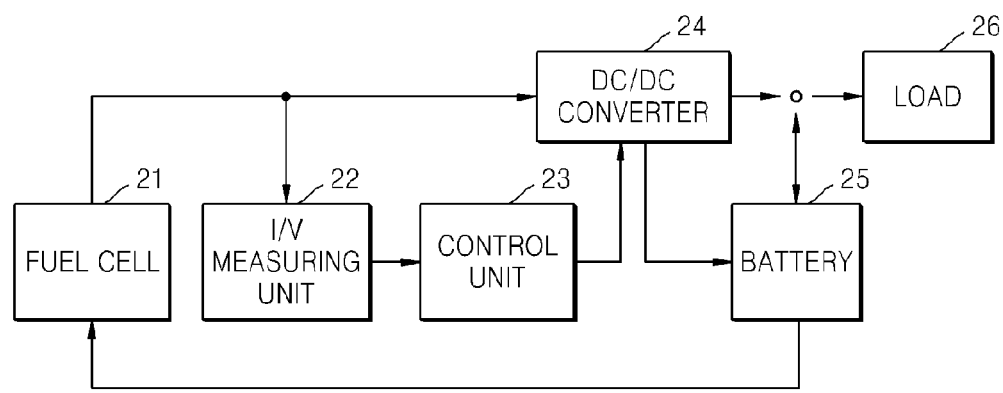
FIG. 2 is a block diagram of a fuel cell system according to an embodiment.

FIG. 2 is a block diagram of a fuel cell system according to an embodiment. Referring to FIG. 2, the fuel cell system includes a fuel cell 21, a current/voltage (I/V) measuring unit 22, a control unit 23, a direct current/direct current (DC/DC) converter 24, and a battery 25.

The fuel cell 21 is an electrical generation device that converts chemical energy of a fuel into a direct electrical energy via an electrochemical reaction, and thus generates direct current (DC) power. Examples of the fuel cell 21 include a Solid Oxide Fuel Cell (SOFC), a Polymer Electrolyte Membrane Fuel Cell (PEMFC), a Direct Methanol Fuel Cell (DMFC), and the like. However, aspects are not limited thereto such that a similar cell, such as a solar cell, may be used instead of the aforementioned cells.

The I/V measuring unit 22 measures a current value $I_{fc}$ and a voltage value $V_{fc}$, which are respectively related to a current and a voltage output from the fuel cell 21. In the present embodiment of FIG. 2, the current value $I_{fc}$ or the voltage value $V_{fc}$ of the fuel cell 21 indicates a value of a current or a voltage output from an anode or a cathode of a stack of the fuel cell 21.

The control unit 23 controls a current output of the fuel cell 21 by adjusting a target voltage value $V_t$ of the fuel cell 21 according to a difference between the current value $I_{fc}$ of the fuel cell 21, which is measured by the I/V measuring unit 22, and a target constant current value $I_t$. That is, in order for a current value corresponding to the target constant current value $I_t$ to be constantly output from the fuel cell 21, the control unit 23 adjusts the target voltage value $V_t$ of the fuel cell 21 in a proportional manner with respect to the difference between the current value $I_{fc}$ measured by the I/V measuring unit 22 and the target constant current value $I_t$. While not required in all aspects, the control unit 23 and/or I/V measuring unit 22 can be implemented using one or more processors executing software and/or firmware recorded in a computer readable storage medium.

According to the present embodiment, the target constant current value $I_t$ of the fuel cell 21 may be set in consideration of an operation condition of the fuel cell 21, wherein the operation condition includes a temperature of the fuel cell 21, an ambient temperature, a fuel supply environment, a load, and the like, but is not limited thereto. The target constant current value $I_t$ of the fuel cell 21 may be manually set by a user, or may be automatically set by adding a unit in the fuel cell system to detect the operation condition of the fuel cell 21. That is, the control unit 23 adjusts the target voltage value $V_t$ of the fuel cell 21 according to a difference between the current value $I_{fc}$ of the fuel cell 21, which is measured by the I/V measuring unit 22, and the target constant current value $I_t$ that is set in consideration of the operation condition of the fuel cell 21. Also, the control unit 23 may adjust the target voltage value $V_t$ of the fuel cell 21 according to a difference between the current value $I_{fc}$ of the fuel cell 21 and a target constant current value $I_t$ that is set by a user in consideration of a unique load power consumption pattern of the user.

The DC/DC converter 24 converts a voltage output from the fuel cell 21 into a voltage according to a control signal of the control unit 23. A power output from the DC/DC converter 24 may be supplied to both a load 26 and the battery 25, or only to the load 26 according to a voltage difference between an output voltage of the DC/DC converter 24 and an output voltage of the battery 25.

The battery 25 supplies the fuel cell 21 with a power for an initial starting of the fuel cell 21. Also, after the starting of the fuel cell 21, the battery 25 stores a surplus power from among the power output from the DC/DC converter 24, except for a power supplied to the load 26, or supplies the load 26 with a power for complementing the power output from the DC/DC converter 24. If a power output from the fuel cell 21 is excessive with respect to a power requested by the load 26, the power output from the DC/DC converter 24 is supplied to both the load 26 and the battery 25. In this case, the battery 25 is charged. On the other hand, if the power output from the fuel cell 21 is insufficient with respect to the power requested by the load 26, the power output from the DC/DC converter 24 is supplied only to the load 26, and a power corresponding to the insufficiency is provided by the battery 25. In this case, the battery 25 is discharged. The battery 25 according to the present embodiment is a secondary battery that may be charged by the power output from the DC/DC converter 24, and may be a lithium ion battery having a high energy density, but is not limited thereto.

As described above, the present embodiment may complement for an excessive power and an insufficient power due to a constant current output of the fuel cell 21 by charging and discharging the battery 25. For this, the control unit 23 generates a control signal to control the current output of the fuel cell 21, according to a difference between the voltage value $V_{fc}$ of the fuel cell 21 and the target voltage value $V_t$ and according to the output voltage of the battery 25. The DC/DC converter 24 converts the voltage output from the fuel cell 21 into the voltage according to the control signal generated by the control unit 23. Hereinafter, a circuit configuration of the control unit 23 will be described. According to the circuit configuration, the control unit 23 may be embodied as a simple circuit that does not request a separate charge circuit with respect to the battery 25, but is not limited thereto.

Figure 3:
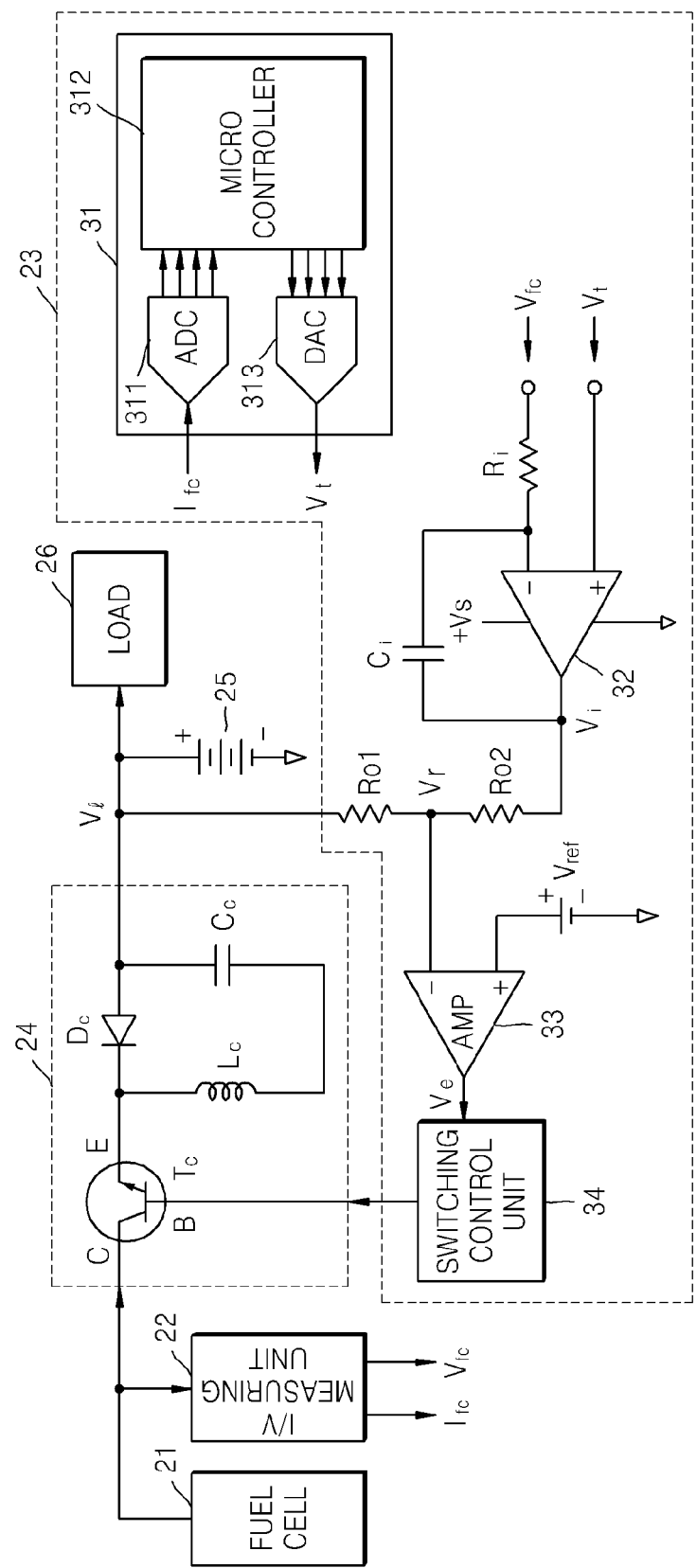
FIG. 3 is a detailed circuit diagram of a control unit and a DC/DC converter illustrated in FIG. 2.

FIG. 3 is a detailed circuit diagram of the control unit 23 and the DC/DC converter 24 illustrated in FIG. 2. Referring to FIG. 3, the control unit 23 includes a voltage determining unit 31, an integrator 32, a difference amplifier 33, a switching control unit 34, a resistor Ro1, and a resistor Ro2.

The DC/DC converter 24 may include a transistor $T_c$, an inductor $L_c$, a capacitor $C_c$, and a diode $D_c$, and may be embodied as a buck/booster converter in which the aforementioned components are arrayed as illustrated in FIG. 3. The buck/booster converter may decrease or increase an input voltage, and is well known to one of ordinary skill in the art, and thus, a detailed description thereof will be omitted here. An ideal ratio of the input voltage to an output voltage of the buck/booster converter is given by Equation 1.

$$\frac{V_l}{V_{fc}} = \frac{D}{D-1} \qquad \text{Equation 1}$$

Referring to Equation 1, an input voltage $V_{fc}$ indicates the voltage output from the fuel cell 21, and an output voltage $V_l$ indicates a voltage applied to the load 26. Also, D indicates a ratio of a total period in which the transistor $T_c$ is turned on/off to a period in which the transistor $T_c$ is turned on, and is generally referred to as a duty cycle. That is, when the transistor $T_c$ remains in an off state, D is 0, and when the transistor $T_c$ remains in an on state, D is 1. Except for these two cases, D is between 0 and 1. When a voltage value of a base of the transistor $T_c$ reaches a threshold value, that is, when the transistor $T_c$ is saturated, a current flows or does not flow on a line between a collector C and an emitter E of the transistor $T_c$. By using this characteristic of the transistor $T_c$, D of Equation 1 may be changed by adjusting a voltage value input to the base B of the transistor $T_c$ so that a voltage input to the buck/booster converter may be decreased or increased.

Polarities of the input voltage $V_{fc}$ and the output voltage $V_l$ in Equation 1 are reverse. Thus, according to the present embodiment, the DC/DC converter 24 and the fuel cell 21 are connected to each other in such a manner that a polarity of the DC/DC converter 24 is reverse to a polarity of the fuel cell 21. By doing so, a polarity of the output voltage $V_l$ of the DC/DC converter 24 may be normal. Also, it is possible to design a circuit by which the polarity of the output voltage $V_l$ of the DC/DC converter 24 may become reverse. In this regard, one of ordinary skill in the art understands that the DC/DC converter 24 may be designed according to various methods and constructions as well as the aforementioned methods and constructions.

The voltage determining unit 31 compares the current value $I_{fc}$ of the fuel cell 21, which is measured by the I/V measuring unit 22, with the target constant current value $I_t$, and determines the target voltage value $V_t$ according to a result of the comparison. That is, the voltage determining unit 31 includes an Analog-Digital-Converter (ADC) 311, a microcontroller 312, and a Digital-Analog-Converter (DAC) 313. The ADC 311 converts a form of the current value $I_{fc}$ of the fuel cell 21, which is measured by the IN measuring unit 22, from an analog signal into a digital signal. Since the microcontroller 312 is a digital device, the microcontroller 312 may not recognize an analog signal. That is, the ADC 311 functions to convert the form of the current value $I_{fc}$ of the fuel cell 21, which is measured by the I/V measuring unit 22, into a digital signal recognizable by the microcontroller 312.

Figure 4:
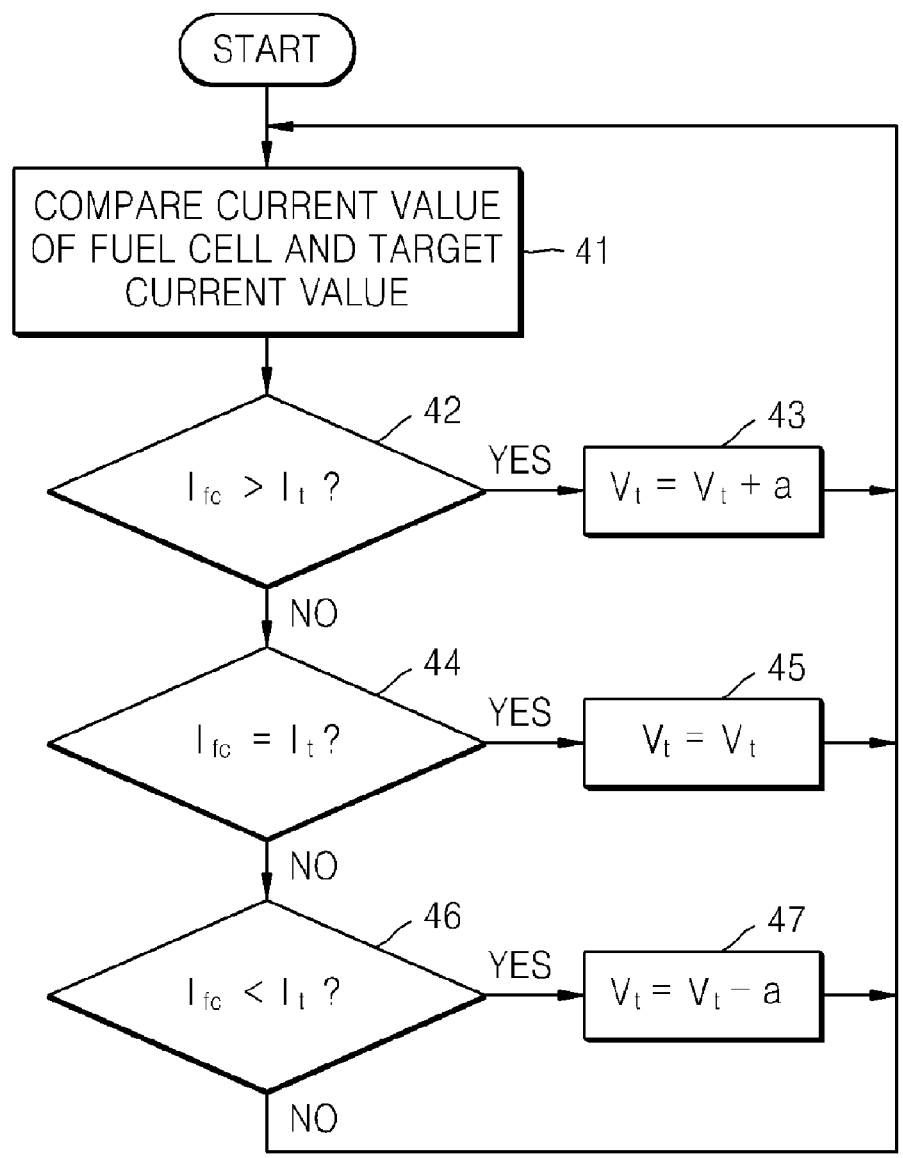
FIG. 4 is a flowchart of an internal operation of a microcontroller illustrated in FIG. 3.

FIG. 4 is a flowchart of an internal operation of the microcontroller 312 illustrated in FIG. 3. Referring to FIG. 4, in operation 41, the microcontroller 312 compares the current value $I_{fc}$ of the fuel cell 21, which is measured by the I/V measuring unit 22, with the target constant current value $I_t$. In operation 42, as a result of the comparison performed in operation 41, if the current value $I_{fc}$ of the fuel cell 21 is greater than the target constant current value $I_t$, the microcontroller 312 proceeds to operation 43. In operation 43, the microcontroller 312 increases the target voltage value $V_t$ of the fuel cell 21 by as much as a selected unit a. In operation 42, if the current value $I_{fc}$ of the fuel cell 21 is not greater than the target constant current value $I_t$, the microcontroller 312 proceeds to operation 44. In operation 44, as the result of the comparison performed in operation 41, if the current value $I_{fc}$ of the fuel cell 21 is equal to the target constant current value $I_t$, the microcontroller 312 proceeds to operation 45. In operation 45, the microcontroller 312 maintains the target voltage value $V_t$ of the fuel cell 21. In operation 44, if the current value $I_{fc}$ of the fuel cell 21 is not equal to the target constant current value $I_t$, the microcontroller 312 proceeds to operation 46. In operation 46, as the result of the comparison performed in operation 41, if the current value $I_{fc}$ of the fuel cell 21 is less than the target constant current value $I_t$, the microcontroller 312 proceeds to operation 47. In operation 47, the microcontroller 312 decreases the target voltage value $V_t$ of the fuel cell 21 by as much as the selected unit a. In operation 46, if the current value $I_{fc}$ of the fuel cell 21 is not greater to the target constant current value $I_t$, the microcontroller 312 proceeds back to operation 41. The selected unit a of operations 43 and 47 may be equal or different, and/or may be predetermined or determinable, but aspects are not limited thereto. Further, although described having a specific order of operation, the internal operation of the microcontroller 312 is not limited thereto such that the described operations may be performed in an order different than described.

Referring back to FIG. 3, the DAC 313 converts a form of the target voltage value $V_t$ of the fuel cell 21 from a digital signal into an analog signal, wherein the target voltage value $V_t$ is calculated by the microcontroller 312. In the present embodiment, the selected unit a may be determined according to the resolution of the ADC 311 and the DAC 313. If the resolution of the ADC 311 and the DAC 313 is high, that is, if the ADC 311 and the DAC 313 may precisely convert an analog signal into a digital signal and may precisely convert a digital signal into an analog signal, the selected unit a may decrease. On the other hand, if the resolution of the ADC 311 and the DAC 313 is low, the selected unit a may increase.

The integrator 32 integrates a difference between the voltage value $V_{fc}$ of the fuel cell 21, which is measured by the I/V measuring unit 22, and the target voltage value $V_t$ determined by the voltage determining unit 31. In other words, the voltage value $V_{fc}$ of the fuel cell 21 is input to a cathode of an operational amplifier (OP Amp) of the integrator 32, and a signal output from the DAC 313, that is, the target voltage value $V_t$ determined by the voltage determining unit 31, is input to an anode of the OP Amp. Assuming that the OP Amp of the integrator 32 is an ideal OP Amp, the integrator 32 functions as an ideal inverse integrator, and $V_i(t)$ output from the OP Amp of the integrator 32 is defined as Equation 2.

$$V_i(t) = -\frac{1}{C_i R_i} \int_0^t V_s(s)ds + V_i(0) \quad \text{Equation 2}$$

Referring to Equation 2, $V_s(s)$ indicates the difference between values respectively input to the anode and the cathode of the OP Amp of the integrator 32, that is, the difference between the voltage value $V_{fc}$ of the fuel cell 21 and the target voltage value $V_t$ determined by the voltage determining unit 31. Also, $V_i(0)$ indicates an initial voltage value accumulated in a capacitor $C_i$ of the integrator 32. In this manner, the integrator 32 integrates the difference between the voltage value $V_{fc}$ of the fuel cell 21 and the target voltage value $V_t$ determined by the voltage determining unit 31, and when a period continues, wherein the voltage value $V_{fc}$ of the fuel cell 21 is greater than the target voltage value $V_t$ determined by the voltage determining unit 31 during the period, the integrator 32 outputs a value to be increased. Also, when a period continues, wherein the voltage value $V_{fc}$ of the fuel cell 21 is less than the target voltage value $V_t$ determined by the voltage determining unit 31 during the period, the integrator 32 outputs a value to be decreased.

In the present embodiment, as a limiting voltage of the OP Amp of the integrator 32, +Vs and 0 are input so that, when the voltage value $V_{fc}$ of the fuel cell 21 is less than the target voltage value $V_t$ determined by the voltage determining unit 31, the output value of the OP Amp of the integrator 32 may not exceed +Vs. Also, when the voltage value $V_{fc}$ of the fuel cell 21 is equivalent to or greater than the target voltage value $V_t$ determined by the voltage determining unit 31, the output value of the OP Amp of the integrator 32 may be equivalent to 0V, that is, to ground.

As illustrated in FIG. 3, assuming that a voltage applied to the load 26 is indicated by V1, an output voltage of the integrator 32 is indicated by Vi, and the difference amplifier 33 is an ideal OP Amp, a current flowing into the difference amplifier 33 becomes 0 so that a voltage Vr applied between the resistor Ro1 and the resistor Ro2 is defined as Equation 3.

$$V_r = \frac{Ro1 V_i + Ro2_i V}{Ro1 + Ro2} \quad \text{Equation 3}$$

The difference amplifier 33 amplifies a difference between the voltage Vr, which is applied between the resistor Ro1 and the resistor Ro2, and a reference voltage Vref. That is, the voltage Vr between the resistor Ro1 and the resistor Ro2 is input to a cathode of the difference amplifier 33, and the reference voltage Vref is input to an anode of the difference amplifier 33. Assuming that the difference amplifier 33 is the ideal OP Amp, a voltage Ve is defined as Equation 4.

$$V_e = A(V_{ref} - V_r) \quad \text{Equation 4}$$

Referring to Equation 4, the reference voltage $V_{ref}$ allows the voltage $V_r$ to be in a range of voltages enabled to be input to the difference amplifier 33, and A indicates a voltage gain. That is, the difference amplifier 33 outputs the voltage $V_e$ having a level that is A times of the difference between the voltage $V_r$, which is applied between the resistor Ro1 and the resistor Ro2, and the reference voltage $V_{ref}$ to the switching control unit 34.

The switching control unit 34 controls an on/off switching operation of the transistor $T_c$ of the DC/DC converter 24, according to the voltage $V_e$ output from the difference amplifier 33. A control signal output from the switching control unit 34 is input to the base B of the transistor $T_c$ of the DC/DC converter 24, and according to the control signal output from the switching control unit 34, the duty cycle D of the transistor $T_c$ varies. That is, the DC/DC converter 24 decreases or increases a voltage that is input to the DC/DC converter 24 from the switching control unit 34, according to the control by the switching control unit 34.

Referring back to FIG. 1, assuming that the target constant current value $I_t$ of the fuel cell 21 is $I_t$ and the target voltage value $V_t$ of the fuel cell 21 is 10V, the fuel cell system according to the embodiment of FIGS. 2 and 3 operates in a following manner according to an operation condition and operation time of the fuel cell 21.

In the case where a power consumed in the load 26 decreases so that a voltage of the fuel cell 21 exceeds 10V corresponding to the target constant current value $I_t$ at the first performance curve of FIG. 1, the voltage value $V_{fc}$ of the fuel cell 21 becomes greater than the target voltage value $V_t$ determined by the voltage determining unit 31 so that an output of the OP Amp of the integrator 32 is equivalent to 0V, which may be a reference or a ground voltage. In this case, the control unit 23 controls the DC/DC converter 24 to output a voltage slightly greater than the output voltage of the battery 25. Accordingly, when the voltage value $V_{fc}$ of the fuel cell 21 becomes greater than the target voltage value $V_t$ determined by the voltage determining unit 31, a value of the voltage output from the DC/DC converter 24 is fixed as a selected value that is slightly greater than a value of the output voltage of the battery 25. That is, only the power of the fuel cell 21 is supplied to the load 26, and, simultaneously, the battery 25 is charged.

In the case where the power consumed in the load 26 increases or fuel cell 21 has operated for a time so that the performance of the fuel cell 21 is degraded so as to correspond to the second performance curve of FIG. 1, the voltage of the fuel cell 21 becomes less than 10V. Thus, the voltage value $V_{fc}$ of the fuel cell 21 becomes less than the target voltage value $V_t$ determined by the voltage determining unit 31 so that a voltage slightly greater than 0V, which may be a reference or a ground voltage, is output from the OP Amp of the integrator 32. In this case, the control unit 23 controls the DC/DC converter 24 to output a voltage equivalent to the output voltage of the battery 25. Accordingly, when the voltage value $V_{fc}$ of the fuel cell 21 becomes less than the target voltage value $V_t$ determined by the voltage determining unit 31, a value of the voltage output from the DC/DC converter 24 is always equivalent to the value of the output voltage of the battery 25. That is, the power of the fuel cell 21 and the power of the battery 25 are simultaneously supplied to the load 26.

In this manner, according to the embodiment of FIGS. 2 and 3, even if the operation condition of the fuel cell 21 changes because a sudden change occurs in the load 26, or the fuel cell 21 has operated for a time sufficient to decrease performance thereof, a constant current may be supplied to the load 26. By doing so, load problems of the fuel cell 21 may be resolved.

According to the embodiment of FIGS. 2 and 3, in order to maintain the target constant current value $I_t$ of the fuel cell 21, the target voltage value $V_t$ of the fuel cell 21 is increased to be greater than 10V or decreased to be less than 10V according to the operation condition and the operation time of the fuel cell 21. For example, when the current value $I_{fc}$ of the fuel cell 21 is greater than the target constant current value $I_t$, the target voltage value $V_t$ of the fuel cell 21 is increased by as much as the selected unit a. As a result, the target voltage value $V_t$ input to the anode and the cathode of the OP Amp of the integrator 32 is increased, and the voltage value $V_{fc}$ of the fuel cell 21 becomes less than the target voltage value $V_t$ determined by the voltage determining unit 31, so that a voltage slightly greater than 0, which may be a reference or a ground voltage, is output from the OP Amp of the integrator 32. In this case, the control unit 23 controls the DC/DC converter 24 to output the voltage equivalent to the output voltage of the battery 25. Accordingly, the power of the fuel cell 21 and the power of the battery 25 are simultaneously supplied to the load 26. Since there is no voltage difference between the DC/DC converter 24 and the battery 25, a current of the fuel cell 21, which flows into the load 26, is limited so that an operation voltage of the fuel cell 21 is increased. This procedure is repeated until the current output from the fuel cell 21 reaches the target constant current value $I_t$.

Also, when the current value $I_{fc}$ of the fuel cell 21 is equivalent to the target constant current value $I_t$, the target voltage value $V_t$ of the fuel cell 21 is constantly maintained, and when the current value $I_{fc}$ of the fuel cell 21 less than the target constant current value $I_t$, the target voltage value $V_t$ of the fuel cell 21 is decreased until the current output from the fuel cell 21 reaches the target constant current value $I_t$. For example, when the current value $I_{fc}$ of the fuel cell 21 is less than the target constant current value $I_t$, the target voltage value $V_t$ of the fuel cell 21 is decreased by as much as the selected unit a. As a result, the target voltage value $V_t$ input to the anode and the cathode of the OP Amp of the integrator 32 is decreased, and the voltage value $V_{fc}$ of the fuel cell 21 becomes greater than the target voltage value $V_t$ determined by the voltage determining unit 31, so that a voltage equivalent to 0V, which may be a reference or a ground voltage, is output from the OP Amp of the integrator 32. In this case, the control unit 23 controls the DC/DC converter 24 to output a voltage slightly greater than the output voltage of the battery 25. Accordingly, only the power of the fuel cell 21 is supplied to the load 26, and simultaneously, the battery 25 is charged. Due to the voltage difference between the DC/DC converter 24 and the battery 25, the current of the fuel cell 21, which flows into the load 26 and the battery 25, is increased so that the operation voltage of the fuel cell 21 is decreased. This procedure is repeated until the current output from the fuel cell 21 reaches the target constant current value $I_t$.

FIG. 5 is a flowchart of a fuel cell power managing method, according to an embodiment. Referring to FIG. 5, the fuel cell power managing method according to the present embodiment includes operations that are processed in chronological order in the fuel cell system of FIG. 2. Thus, although not described with reference to the fuel cell power managing method, the aforementioned description for the fuel cell system of FIG. 2 also applies to the fuel cell power managing method according to the present embodiment.

In operation 51, the fuel cell system measures the current value $I_{fc}$ and the voltage value $V_{fc}$, which are output from the fuel cell 21. In operation 52, the fuel cell system increases/decreases the target voltage value $V_t$ of the fuel cell 21 by as much as the selected unit a, or maintains the target voltage value $V_t$ of the fuel cell 21, according to the difference between the current value $I_{fc}$ of the fuel cell 21, which is measured in operation 51, and the target constant current value $I_t$.

In operation 53, the fuel cell system integrates the difference between the voltage value $V_{fc}$ of the fuel cell 21, which is measured in operation 51, and the target voltage value $V_t$ determined in operation 52.

In operation 54, the fuel cell system amplifies the difference between the voltage $V_r$ and the reference voltage $V_{ref}$, wherein the voltage $V_r$ is determined according to a voltage corresponding to a result of the integration in operation 53 and a voltage of a common connection point between the DC/DC converter 24, the battery 25, and the load 26.

In operation 55, the fuel cell system generates the control signal for controlling the current output of the fuel cell 21, according to the amplified voltage value $V_e$ obtained in operation 54.

In operation 56, the fuel cell system converts the voltage output from the fuel cell 21 into a voltage according to the control signal generated in operation 55.

In operation 57, according to a status of the load 26, the fuel cell system stores a portion of a power which is output with the voltage that is converted in operation 56, or supplies a complementary power from the battery 25 (i.e., a power complementary to the power output from the DC/DC converter 24.

When operation 57 is ended, the fuel cell system returns to operation 51, and repeats operations 51 through 57 until the current output from the fuel cell 21 reaches the target constant current value $I_t$.

As described above, according to the one or more of the above embodiments, by adjusting the target voltage value $V_t$ of the fuel cell 21 according to the difference between the current value $I_{fc}$ output from the fuel cell 21 and the target constant current value $I_t$, a current may be constantly and stably output from the fuel cell 21. In general, the fuel cell 21 outputs a constant power when a constant voltage operation is performed as compared to when a constant current operation is performed. In this manner, by allowing the fuel cell 21 to stably output the constant current, fuel supply stability of the fuel cell 21 may be obtained.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A fuel cell system, comprising:
    a measuring unit to measure a current value and a voltage value output from a fuel cell;
    a control unit to control a current output of the fuel cell by adjusting a target voltage value of the fuel cell according to a difference between the measured current value and a target constant current value, and to output a control signal to control the current output of the fuel cell;
    a converter to convert a voltage output from the fuel cell into a voltage applied to a load according to the output control signal from the control unit; and
    a battery to store a portion of a power output from the converter during a charging state or to supply a power complementary to the power output from the converter during a discharging state, wherein:
    the control unit generates the control signal according to both an output voltage of the battery and a difference between the voltage value output from the fuel cell and the adjusted target voltage value, and
    the control unit controls the converter to output the voltage applied to the load according to the output voltage of the battery to adjust between the charging state and the discharging state of the battery during operation of the fuel cell.

2. The fuel cell system of claim 1, wherein the control unit adjusts the target voltage value of the fuel cell in a proportional manner with respect to the difference between the measured current value and the target constant current value.

3. The fuel cell system of claim 1, wherein the control unit increases the target voltage value when the measured current value is greater than the target constant current value.

4. The fuel cell system of claim 1, wherein the control unit decreases the target voltage value when the measured current value is less than the target constant current value.

5. The fuel cell system of claim 1, wherein the target constant current value is set in consideration of an operation condition of the fuel cell.

6. The fuel cell system of claim 1, wherein the battery supplies the fuel cell with a power to start operation of the fuel cell.

7. The fuel cell system of claim 1, wherein the control unit comprises:
    an integrator to integrate the difference between the voltage value of the fuel cell and the target voltage value; and
    a switching control unit to control a switching operation of the converter according to an output voltage of the integrator and the voltage applied to the load.

8. A fuel cell power managing method, comprising:
    measuring a current value and a voltage value which are output from a fuel cell;
    adjusting a target voltage value of the fuel cell according to a difference between the measured current value and a target constant current value of the fuel cell;
    generating a control signal to control a current output from the fuel cell according to a difference between the measured voltage value and the adjusted target voltage value;
    converting a voltage output from the fuel cell into a voltage applied to a load according to the generated control signal; and
    storing a portion of a power output to the load during a charging of a battery or supplying a rower complementary to the power output having the converted voltage for applying to the load during a discharging of the battery, wherein:
    the control signal is generated according to both an output voltage of the battery and a difference between the voltage value output from the fuel cell and the adjusted target voltage value, and
    the converting into the voltage applied to the load being controlled to occur according to the output voltage of the battery to adjust between the charging and the discharging of the battery during operation of the fuel cell.

9. The fuel cell power managing method of claim 8, wherein the adjusting of the target voltage value comprises adjusting the target voltage value of the fuel cell in a proportional manner with respect to the difference between the measured current value and the target constant current value.

10. The fuel cell power managing method of claim 8, wherein the adjusting of the target voltage value comprises increasing the target voltage value when the measured current value is greater than the target constant current value.

11. The fuel cell power managing method of claim 8, wherein the adjusting of the target voltage value comprises decreasing the target voltage value when the measured current value is less than the target constant current value.

12. The fuel cell power managing method of claim 8, wherein the adjusting of the target voltage value comprises increasing or decreasing the target voltage value by as much as a selected unit or maintaining the target voltage value, and
   wherein the measuring, the adjusting, the generating, and the converting operations of the fuel cell power managing method are repeated until the current value output from the fuel cell reaches the target constant current value.

13. The fuel cell power managing method of claim 8, wherein the target constant current value is set in consideration of an operation condition of the fuel cell and/or a power consumption pattern of a user.

14. The fuel cell power managing method of claim 8, wherein the generating comprises:
   integrating the difference between the voltage value output from the fuel cell and the target voltage value; and
   generating the control signal to control the current output of the fuel cell according to a voltage corresponding to a result of the integrating and a voltage applied to a load.

15. A fuel cell system, comprising:
   a fuel cell;
   a measuring unit to measure a current and a voltage of the fuel cell;
   a control unit to compare the measured current of the fuel cell with a target current and determine a target voltage of the fuel cell;
   a converter to convert the voltage of the fuel cell into a voltage applied to a load according the determined target voltage determined by the control unit; and
   a battery to store a portion of a power output from the converter during a charging state or to supply a power complementary to the power output from the converter during a discharging state, wherein:
   the control unit generates a control signal that controls the converter according to both an output voltage of the battery and a difference between the voltage value of the fuel cell and the determined target voltage determined by the control unit, and
   the control unit controls the converter to output the voltage applied to the load according to the output voltage of the battery to adjust between the charging state and the discharging state of the battery during operation of the fuel cell.

16. A computer readable medium comprising instructions that when executed by a computer cause the computer to execute a method, the method comprising:
   adjusting a target voltage value of a fuel cell according to a difference between a measured current value of the fuel cell and a target constant current value of the fuel cell;
   generating a control signal to convert a voltage output from the fuel cell into a voltage applied to a load according to a difference between a measured voltage value and the adjusted target voltage value, the control signal being generated according to both an output voltage of the battery and a difference between a voltage value output from the fuel cell and the adjusted target voltage value; and
   controlling an output voltage applied to the load according to the output voltage of the battery to adjust between a charging and a discharging of the battery during operation of the fuel cell.

17. The fuel cell system of claim 1, wherein:
   when the target voltage value is adjusted by being increased, the voltage applied to the load is set to be equivalent to the output voltage of the battery such that the battery is in the discharging state, and
   when the target value is adjusted by being decreased, the voltage applied to the load is set to be greater than the output voltage of the battery such that the battery is in the charging state.

18. The fuel cell power managing method of claim 8, wherein:
   when the target voltage value is adjusted by being increased, the voltage applied to the load is set be to equivalent to the output voltage of the battery such that the battery is being discharged, and
   when the target value is adjusted by being decreased, the voltage applied to the load is set to be greater than the output voltage of the battery such that the battery is being charged.

* * * * *